July 22, 1947.    D. SANTINI ET AL    2,424,333
ELECTROMAGNETIC BRAKE CONTROL SYSTEM
Filed Dec. 10, 1942
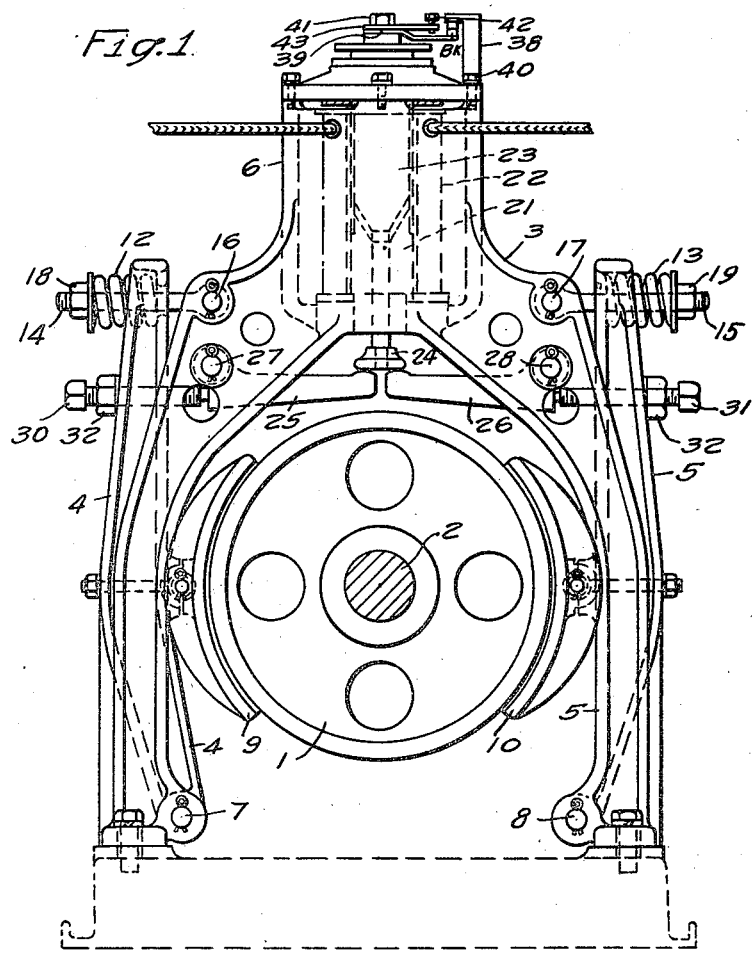
Fig. 1.
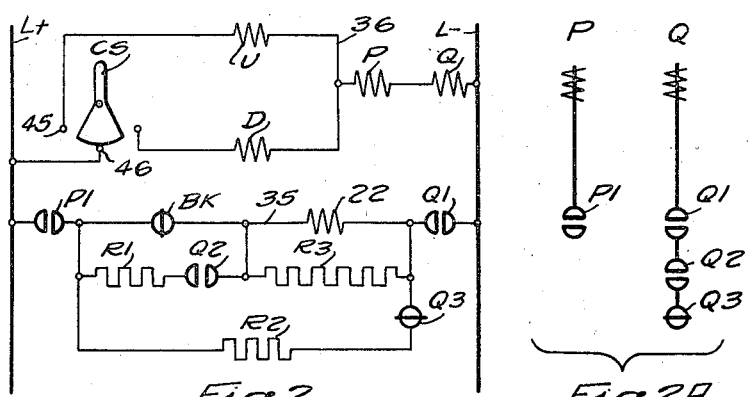
Fig. 2.   Fig. 2A.
WITNESSES:
INVENTORS
Danilo Santini
and Arvid Nelson.
BY
ATTORNEY Patented July 22, 1947

2,424,333

UNITED STATES PATENT OFFICE 2,424,333

ELECTROMAGNETIC BRAKE CONTROL SYSTEM

Danilo Santini, Tenafly, and Arvid Nelson, Hillsdale, N. J., assignors, by mesne assignments, to Westinghouse Electric Corporation, East Pittsburgh, Pa., a corporation of Pennsylvania Application December 10, 1942, Serial No. 468,456

3 Claims. (Cl. 188—172)

Our invention relates to electromechanical brake mechanisms embodying spring means for applying the brake and electromagnetic means for releasing the brake and, more particularly, to the means for controlling the operation of the electromagnet in releasing and applying the brake.

One object of our invention is to provide an electromechanical brake mechanism and control therefor in which the brake plunger, in releasing the brake, will start quickly but will slow down at the time when it reaches the point where the brake is about to be fully applied.

Another object is to provide an electromechanical brake and control therefor in which the tension of the springs for applying the brake may be increased to as much as 100% over the full load capacity and at the same time secure a much softer brake action than that heretofore secured.

A further object is to provide an electromagnetic brake control system which will give a quick starting, soft acting but positive operation which will increase the accuracy of the braking effect in stopping the body to which it is applied.

Other objects of the invention will, in part, be obvious and will, in part, appear hereinafter.

For an illustration of one of the various forms our invention may take, reference may be had to the accompanying drawing in which:

Figure 1 is a view in end elevation of a brake for utilizing our invention;

Fig. 2 is a straight line diagram of the electrical control system for the electromagnet in the brake; and Fig. 2A is a key representation of the relays and the contacts operated thereby embodied in the control system, showing the location of the coils and the contacts in the straight line diagram of Fig. 2.

Referring more particularly to the drawing, I have illustrated a brake mechanism and control therefor particularly well suited for elevators and which is applied to a drum 1 affixed to a driving shaft 2 to which a braking effect is to be applied. Surrounding the brake drum 1 is a yoke or frame 3 which carries and supports a pair of brake levers 4 and 5 and an electromagnet 6 for operating the brake levers. The brake levers 4 and 5 are disposed on opposite sides of the drum 1 with their lower ends pivotally connected by pivot pins 7 and 8 to the frame 3 and are provided with a brake comprising a pair of shoes 9 and 10 for engaging the brake drum 1.

The means for causing the brake shoes 9 and 10 to apply a braking effect to the brake drum 1 comprises a pair of compression springs 12 and 13 which are mounted on the outer ends of a pair of eye bolts 14 and 15 in position to press against the upper ends of the brake levers 4 and 5. The inner ends of the eye bolts 14 and 15 are secured to the frame 3 by pivot pins 16 and 17 and their outer ends are provided with a pair of nuts 18 and 19 by which the tension of the springs 12 and 13 may be adjusted.

The electromagnet 6 for releasing the brake shoes is mounted on the top portion of the frame 3 and comprises a core 21 on which is disposed an energizing coil 22 for operating a movable armature or plunger 23, the lower end 24 of which engages the inner arms of a pair of bell-crank levers 25 and 26 which are pivotally mounted on a pair of pivot pins 27 and 28 in the upper part of the frame 3.

The bell-crank levers 25 and 26 are positioned in the frame 3 in such manner that their outer ends impinge against the inner ends of a pair of set screws 30 and 31 disposed in the brake levers 4 and 5 and thus act as a means for separating the brake levers to release the brake when the electromagnet 6 is energized. When the electromagnet is deenergized the action of the springs in setting the brake shoes returns the plunger to its unoperated position. Each of the set screws 30 and 31 is provided with a locking nut 32 for retaining it in any position to which it may be adjusted.

The clearance between the brake shoes 9 and 10 and the brake drum 1 when the brake levers 4 and 5 are separated by the electromagnet 6 may be adjusted by loosening the locking nuts 32 and rotating the set screws 30 and 31 in the proper direction.

An electrical circuit 35 (Fig. 2) is provided for connecting the brake coil 22 to a source of electrical energy represented by a pair of supply conductors L+ and L—. Although the brake may be used for any purpose, it is particularly well suited to elevator service. Therefore we have illustrated a small portion of an elevator control system 36 as a means by which the brake coil may be energized to release the brake when the elevator car (not shown) is started or deenergized to apply the brake when the car is stopped.

The portion of the control system includes a pair of control relays P and Q, the coil of an up direction switch U, the coil of a down direction switch D, and a car switch CS for selectively energizing the up or the down direction switch when it is desired to start the elevator. The control relays P and Q are energized when the car switch is moved to starting position and deenergized when the car switch is "centered" for a stop. It should be understood that the portion of the elevator control circuit shown is used only as an illustration of a means for operating the brake circuit and that the brake circuit may be connected for operation by any portion of the control circuit which will release the brake when the car starts and apply it when the car stops.

In order to secure a more satisfactory operation of the brake for elevator and other service, we have provided a first or series resistor R1, a second or low discharge resistor R2 and a third or high discharge resistor R3 for use in connection with the brake coil circuit and also means for controlling their connection with the brake coil circuit in accordance with the operation of the brake.

The resistor R1 may have a resistance value of 300 ohms or any other resistance value desired and it is disposed to be inserted in series with the brake coil shortly after the coil is energized so that the coil will not overheat and yet maintain a strong magnetic pull on the brake plunger while the brake remains released.

The means for connecting and disconnecting the resistor R1 in series with the brake coil comprises a switch BK mounted on the brake to be operated by the brake plunger. The switch BK comprises a pair of contact members mounted in cooperative position on the adjacent ends of a supporting arm 38 and a spring 39. The arm 38 is attached to the brake frame 3 by a bolt 40. The base end of the spring is mounted on the upper end of the plunger 23 by a screw threaded nut 41. An adjustable screw 42 is disposed in a supporting arm 43 the base end of which is secured under the nut 41 on the plunger. The screw 42 may be rotated in the arm 43 to adjust the spring 39 to close the switch BK at any desired position of the plunger 23. In practicing our invention, we prefer to adjust the switch so that it will open slightly ahead of the end of the plunger travel when the brake is released and close just as soon as the plunger starts to move when the brake is being applied to stop and hold the car. Any other suitable switch may be employed which will operate to open and close with the plunger as described.

The front contact members Q2 of the control relay Q operate to prevent the resistor R1 from being included in any circuit when the car is standing at a floor.

The resistor R3 is a high ohmic discharge resistor permanently connected in shunt relation with the brake coil to permit a rapid flux decay when the coil is first disconnected from its supply lines in the operation of applying the brake to the brake drum. The resistor R3 may have a resistance value of approximately 4000 ohms or any other desired value.

The resistor R2 is a very low discharge resistor and it is also connected for control by the switch BK in such manner that it will be introduced across the brake coil as the brake is applied when the plunger reaches the predetermined point where it closes the switch BK. The back contact members Q3 of the control relay Q are disposed in the circuit of the resistor R2 to prevent it from being inserted in the brake circuit while the car is in operation. The resistor R2 may have a resistance value of from 0 to 25 ohms, as desired. In practice, we usually find a resistance value of about 5 ohms to be satisfactory.

When the elevator car is standing at a floor, the brake shoes 9 and 10 are normally held in engagement with the brake drum 1 by the compression springs 12 and 13. Assuming that it is desired to start the car in the up direction and that the car switch is moved in clockwise direction when the up direction coil U and the control relays P and Q are energized by the circuit

L+, 46, 45, U, P, Q, L—

The up direction coil U operates control apparatus (not shown) to start the car upwardly in the usual manner. The energized relay P closes its contacts P1 and the energized relay Q closes its contacts Q1 and Q2 and opens its contact Q3.

The closing of the contacts P1 and Q1 energizes the brake coil 22 by the circuit

L+, P1, BK, 22, Q1, L—

The energization of the brake coil 22 causes the armature plunger 24 to move downwardly against the inner ends of the bell-crank levers 25 and 26 and thereby actuate them to operate the brake levers 4 and 5 against the action of the springs 12 and 13, thus releasing the brake shoes 9 and 10 from the brake drum 1. As the brake plunger moves downwardly to a point where the shoes 9 and 10 are close to the end of their travel, it opens the switch BK and thereby inserts the resistor R1 in series with the brake coil 22 by the circuit

L+, P1, R1, Q2, 22, Q1, L—

Since the brake magnetic gap is at its minimum at the time the brake contact BK opens, it is possible to insert a high value of resistance R1 and still maintain the brake fully released. The resistor R1 will remain in circuit with the coil 22 as long as the brake remains released and will prevent overheating of the coil but at the same time leave the coil strongly energized to maintain the brake in the open position to which the plunger moves the shoes in completing its down stroke.

It will be assumed now that the attendant centers the car switch CS to stop the car at the next floor and thereby deenergize the control relays P and Q. The deenergized relay P opens its contacts P1 and the deenergized relay Q opens its contacts Q1 and Q2 and closes its back contacts Q3. The opening of the contacts P1 and Q1 deenergizes the brake coil 22 and inasmuch as the contacts BK and Q2 are now open the discharge circuit of the coil 22 includes only the high value resistor R3 so that the decay of flux in the coil 22 is very rapid and the starting action of the plunger 24 is very quick and in fact almost instantaneous.

As soon as the plunger 24 is moved upwardly by the action of the bell-crank levers 25 and 26 under the power exerted by the springs 12 and 13, the plunger recloses the brake switch BK. The reclosing of the switch BK now inserts the low discharge resistor R2 in a circulatory circuit with the brake coil 22 and thus delays the decay of the remaining flux in the brake coil to such an extent that the brake applying movement of the plunger 24 is delayed sufficiently to give a soft braking effect of the brake shoes 9 and 10 against the drum 1. As the brake plunger comes to rest in its upper position the shoes are held firmly against the brake drum 1 by the springs 12 and 13 and the brake has been set softly and accurately to stop and hold the car.

By the foregoing operation, it will be seen that a single switch operated by the brake plunger inserts the resistor R1 in series with the brake coil when the brake coil is being energized to release the brake and that the reverse movement of the brake plunger in applying the brakes inserts the low discharge resistor R2 at a point where it will tend to soften the brake action, and that we are thereby enabled by a very simple circuit operated by a single brake switch to control the brake coil in the most effective manner.

It will also be apparent that, inasmuch as the discharge resistance is large at the beginning of the stroke and very small at the end, the brake starts to set immediately, delaying its action at the time the full brake torque is applied on the brake wheel, thus increasing the accuracy in the stops.

Furthermore, because of the delayed action in the latter portion of the brake stroke, it is possible to increase the brake spring tension to as much as 100% over the full load capacity with a brake action softer than what would be obtained without this arrangement.

It will also be observed that the foregoing circuit and control therefor is simple and inexpensive to construct, place in service and maintain in operation.

Although we have illustrated and described only one specific embodiment of our invention, it is to be understood that modifications thereof and changes therein may be made without departing from the scope and spirit of the invention.

We claim as our invention:

1. In a brake mechanism, a brake, biasing means for applying the brake, a brake coil for releasing the brake, a circuit for the brake coil, control means for closing and opening the circuit to energize and deenergize the brake coil, a series resistor and a low discharge resistor associated with the circuit, a high discharge resistor permanently connected in a circulatory circuit with the brake coil, means responsive to a closing operation of the control means for preparing the series resistor for inclusion in series with the brake coil and for disconnecting the low discharge resistor from the brake coil and responsive to an opening operation of the control means for disconnecting the series resistor from the brake coil circuit and for preparing the low discharge resistor for inclusion in a circulatory circuit with the brake coil, and a single switch responsive to a predetermined movement of the brake, after the brake coil is energized, for completing the insertion of the series resistor in series with the brake coil and responsive to a predetermined movement of the brake after the circuit is opened for completing the inclusion of the low discharge resistor in circulatory circuit with the brake coil to soften the application of the brake.

2. In an electromechanical brake mechanism, a brake, spring means for applying the brake to a body, a plunger, an electromagnet coil for operating the plunger to release the brake, a circuit for connecting the coil to a supply of electrical energy, said circuit including a brake contact, a high discharge resistor permanently connected in a circulatory circuit with the coil to permit a rapid flux decay in the coil when the circuit is opened, a series resistor for the coil, a low discharge resistor connected to the coil, a control means, means responsive to operation of the control means from its off position to its on position for closing the coil circuit to release the brake, for connecting the series resistor to the coil in parallel relation with the brake contact and for disconnecting one end of the low discharge resistor from the coil and responsive to operation of the control means from its on position to its off position for opening the coil circuit, for disconnecting the series resistor from the coil and for connecting one end of the low discharge resistor to one end of the coil, and means operative by a predetermined brake releasing movement of the plunger after the control means reaches its on position for opening the brake contact to place the series resistor in series with the coil, and operative by a predetermined brake applying movement of the plunger after the control means reaches its off position for closing said brake contact to connect the other end of said low discharge resistor to the other end of the coil to decrease the rapid flux decay in the coil and thereby soften the application of the brake.

3. In an electromechanical brake mechanism, a brake, spring means for applying the brake to a body, a plunger, an electromagnet coil for operating the plunger to release the brake, a circuit for connecting the coil to a supply of electrical energy, said circuit including a brake contact, a high discharge resistor permanently connected in a circulatory circuit with the coil to permit a rapid flux decay in the coil when the circuit is opened, a series resistor disposed in parallel relation with the brake contact, a low discharge resistor connected to the coil, a control means, means responsive to operation of the control means from its off position to its on position for closing the coil circuit to release the brake, for disconnecting one end of the low discharge resistor from the coil and responsive to operation of the control means from its on position to its off position for opening the coil circuit and for connecting one end of the low discharge resistor to one end of the coil, and means operative by a predetermined brake releasing movement of the plunger after the control means reaches its on position for opening the brake contact to place the series resistor in series with the coil, and operative by a predetermined brake applying movement of the plunger after the control means reaches its off position for closing said brake contact to connect the other end of said low discharge resistor to the other end of the coil to decrease the rapid flux decay in the coil and thereby soften the application of the brake.

DANILO SANTINI.
ARVID NELSON.

REFERENCES CITED

The following references are of record in the file of this patent:

UNITED STATES PATENTS

| Number | Name | Date |
| --- | --- | --- |
| 1,621,384 | Thropp | Mar. 15, 1927 |
| 1,713,228 | Harrington | May 14, 1929 |
| 1,551,401 | Jones | Aug. 25, 1925 |
| 1,677,024 | Eaton | July 10, 1928 |